July 20, 1948. C. H. GEROULD ET AL 2,445,572
DRYING PHOTOGRAPHIC PRINTS
Filed July 8, 1946
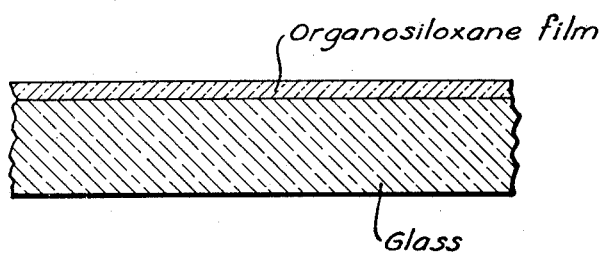
INVENTORS.
Charles H. Gerould
BY Paul C. Woodland
Griswold & Burdick
ATTORNEYS Patented July 20, 1948

2,445,572

UNITED STATES PATENT OFFICE 2,445,572

DRYING PHOTOGRAPHIC PRINTS

Charles H. Gerould and Paul C. Woodland, Midland, Mich., assignors to The Dow Chemical Company, Midland, Mich., a corporation of Delaware Application July 8, 1946, Serial No. 682,028

1 Claim. (Cl. 34—9)

This invention relates to an improvement in the preparation of photographic prints. It is particularly concerned with an improved squeegee plate with which prints are contacted during drying.

In the preparation of a photographic print having a high gloss, the emulsion side of the wet print is placed against a clean, flat, smooth surface, and the surplus water is removed by running a rubber straitedged squeegee or a print roller over the back of the print. It is quite important that small air pockets be eliminated and that the print and plate be in firm, intimate contact at all points. To obtain the best results, a highly polished surface such as a chromium-metal plate or a ferrotype plate is generally used. The latter consists of a thin, iron sheet coated with a hard, smooth, glossy enamel. As the prints dry, they fall away from the plate, if the contacting surface was uniformly clean and smooth. Unless care is taken, the polished corrosion-resistant surfaces of squeegee plates may become scratched and cracked. As a result, the finished prints are frequently marred by the scratches as well as by stains such as rust, etc.

To insure a uniformly smooth surface on the squeegee plate, and to prevent adhesion of dry prints thereto, it is customary to interpose between the plate and the wet paper a thin film of a lubricant, e. g. paraffin wax. This treatment, however, lacks permanency, and necessitates frequent cleaning and recoating of the plate.

We have found that an improved squeegee plate can be produced by modifying a smooth surface of glass with an organosiloxane polymer. By "organosiloxane polymer" we mean a condensation product containing a plurality of silicon atoms, joined to other silicon atoms through oxygen atoms, the remaining valences of the silicon being satisfied by hydrocarbon radicals, such as alkyl, aryl or aralkyl radicals, or hydrogen and one or more of such hydrocarbon radicals. These condensation products may be conveniently prepared from hydrolyzable organosilanes having at least one hydrocarbon radical attached to silicon through a carbon-silicon linkage, and at least one readily hydrolyzable substituent such as a halogen atom, a hydrocarbonoxy group, an amino group, etc., by reacting said organosilanes with water. As is known, condensation of the hydrolysis products takes place concurrently with the formation of organosiloxane polymers.

The single figure of the accompanying drawing shows a cross-section of a squeegee plate composed of glass coated with an invisible thin film of an organosiloxane. For purpose of illustration, the drawing shows a film of exaggerated thickness. In practice, the film usually is very thin, e. g. in some instances probably of a thickness corresponding to only a few molecules of an organosiloxane polymer.

The mode of treatment of the glass surface to produce a satisfactory squeegee plate depends upon the organosilicon compound employed. It is essential that the film be firmly bound to the glass. For example, when a 1 per cent by weight solution of an organosiloxane polymer, e. g. dimethyl siloxane oil, in carbon tetrachloride is spread over the surface of a glass plate, and the solvent volatilized, a thin film of the oil remains on the surface. Glass bearing such a film of lubricant is not very satisfactory as a squeegee plate, as dry photographic prints do not readily separate therefrom. However, if a plate which has been treated in the manner just described is heated at a temperature of from 250° to 300° C. or thereabouts for a short time, the organosiloxane film becomes bonded to the glass to produce a modified surface suitable for use as a squeegee plate.

It is frequently advantageous to form the organosiloxane film in situ, e. g. by applying to a clean surface of the glass a hydrolyzable organosilane such as an alkyl trihalosilane, or a dialkyl dihalosilane, and subsequently reacting with water. The organosiloxane film produced in this manner apparently becomes bonded to the glass during the condensation at ordinary temperatures, and the resultant modified surface is admirably suitable for drying of photographic prints. Examples of suitable organosilanes include methyl trichlorosilane, $CH_3SiCl_3$; methyl dichlorosilane, $CH_3SiCl_2H$; dimethyl dibromosilane, $(CH_3)_2SiBr_2$; ethyl tribromosilane, $C_2H_5SiBr_3$; dipropyl dichlorosilane, $(C_3H_7)_2SiCl_2$; butyl trichlorosilane, $C_4H_9SiCl_3$; hexyl tribromosilane, $C_6H_{13}SiBr_3$; octyl dichlorosilane, $C_8H_{17}SiCl_2H$; dodecyl trichlorosilane, $C_{12}H_{25}SiCl_3$, etc.

In a preferred mode of carrying out the invention, a hydrolyzable organosilane is applied as a dilute solution in a volatile organic solvent to the surface to be used as a squeegee plate. For example, a pane of window glass may be cleaned, e. g. with soap and water, dried, and one or both of its extended surfaces swabbed with a dilute solution of an organosilane in a volatile solvent such as benzene, etc. An example of a satisfactory solution consists of 0.5 part by weight of octadecyl trichlorosilane and 99.5 parts of carbon tetrachloride, although solutions of much greater or lesser concentration may be used. After applying the solution, the plate is allowed to stand to permit volatilization of the solvent. The surface is then washed with water, and any excess organosiloxane is removed, e. g. by wiping with a cloth. The plate is then ready for use.

Wet prints may be applied to the treated surface, and squeegeed in the usual manner. The transparency of the glass plate permits inspection of the emulsion side of the mounted print, to determine intimacy of contact, absence of air pockets, etc. When dry, the print usually does not drop away from the glass, but is retained, apparently because of a charge of static electricity, and is readily lifted from the glass. A print dried in contact with the squeegee plate of this invention has a high gloss, equivalent to the smoothness of the glass.

The modified glass pane or surface may be used repeatedly, e. g. 50 times or more, before it becomes necessary to renew the organosiloxane film. Such a plate may be used intermittently or for successive dryings, as desired. Dirt does not adhere tightly to the treated surface. After standing unused for sometime, the plate is ready for use after being wiped with a lintless cloth, or rinsed with water. The firmly bonded organosiloxane film is sufficiently stable to withstand considerable cleaning, e. g. with soap and water.

Other modes of carrying out the invention may be employed instead of those explained, change being made as regards the compounds and materials herein disclosed, provided the steps or compounds stated by the following claim or equivalents of such steps or compounds be employed.

We therefore claim:

A method of producing a glossy photographic print which comprises drying the wet print in contact with a glass plate bearing a film of an organosiloxane polymer.

CHARLES H. GEROULD.
PAUL C. WOODLAND.

REFERENCES CITED

The following references are of record in the file of this patent:

UNITED STATES PATENTS

| Number | Name | Date |
| --- | --- | --- |
| 2,306,222 | Patnode | Dec. 22, 1942 |
| 2,390,370 | Hyde | Dec. 4, 1945 |
| 2,392,805 | Biefeld | Jan. 15, 1946 |
| 2,413,049 | Hyde | Dec. 24, 1946 |
| 2,413,050 | Hyde | Dec. 24, 1946 |